United States Patent [19]

Hiraoka et al.

[11] 4,312,907
[45] Jan. 26, 1982

[54] WATER-IMPERMEABLE SHEET MATERIAL

[75] Inventors: Yoshiji Hiraoka, Musashino; Tsutomu Obayashi, Tokyo, both of Japan

[73] Assignee: Hiraoka & Co. Ltd., Tokyo, Japan

[21] Appl. No.: 130,523

[22] Filed: Mar. 14, 1980

[30] Foreign Application Priority Data

Jul. 20, 1979 [JP] Japan .................................. 54-92242
Jul. 28, 1979 [JP] Japan .................................. 54-96417
Aug. 31, 1979 [JP] Japan ................................. 54-111978

[51] Int. Cl.³ ............................................ B32B 23/00
[52] U.S. Cl. ................................... 428/212; 428/219; 428/237; 428/241; 428/243; 428/286; 428/326; 428/327; 428/330; 428/341; 428/494; 428/495; 428/507; 428/521; 428/492

[58] Field of Search ............... 428/212, 237, 240, 241, 428/242, 243, 248, 249, 250, 252, 283, 289, 290, 326, 327, 330, 904, 219, 341, 492, 494, 495, 507, 521

[56] References Cited

U.S. PATENT DOCUMENTS 1,602,986 10/1926 Mason .................................. 428/492

Primary Examiner—Marion McCamish
Attorney, Agent, or Firm—Benasutti Associates, Ltd.

[57] ABSTRACT

A water-impermeable sheet material capable of preventing formation of water drops thereon, has one or two water-impermeable layers, at least one of which layers holds, on the surface thereof, a water drop-preventing agent in the form of fine solid particles and consisting of at least one hydrophilic but water-insoluble substance, at least a portion of the water drop-preventing agent being exposed to the ambient atmosphere.

20 Claims, 4 Drawing Figures

WATER-IMPERMEABLE SHEET MATERIAL

FIELD OF THE INVENTION

The present invention relates to a water-impermeable sheet material. More particularly, the present invention relates to a water-impermeable sheet material useful as a covering sheet which is capable of preventing undesirable formation of water drops from atmospheric moisture on a surface thereof.

BACKGROUND OF THE INVENTION

It is known that a conventional water-impermeable sheet material, for instance, a covering sheet, is made from a hydrophobic polymer film or sheet or a fiber sheet coated or impregnated with a hydrophobic polymer material.

In the conventional air-impermeable, water-proof sheet material, one or two surfaces of the sheet material are made from a natural rubber, synthetic rubber or synthetic film-forming polymeric material, for example, polyvinyl chloride. This type of surface of the conventional air-impermeable, water-proof sheet material is highly hydrophobic and, sometimes, water-repellent. Therefore, when the hydrophobic surface of the sheet material is brought into contact with water, the water exhibits a contact angle of 90 degrees or more to the hydrophobic surface of the sheet material. That is, the water cannot spread on the hydrophobic surface or penetrate into the sheet material. Therefore, the water on the hydrophobic surface of the sheet material forms water drops on the hydrophobic surface.

When the above-mentioned type of air impermeable, water-proof sheet material is used as a covering sheet, for example, for a hood of truck or boat or a tent, in order to protect people or articles from rain or dew it is frequently found that a reduction in the atmospheric temperature causes moisture in a space covered by the covering sheet to be condensed so as to form water drops on the lower surface of the covering sheet. Since the lower surface of the covering sheet is usually highly hydrophobic and, sometimes, water-repellent, the water drops cannot spread on the lower surface and penetrate into the covering sheet. The water drops on the lower surface of the covering sheet are incorporated into each other which increases their size and weight, and, finally, the water drops, having an increased size and weight thereof, are released and fall down gravitationally from the lower surface onto the articles or people.

Accordingly, it is desirable to provide a water-impermeable sheet material which allows the condensed water on a surface thereof to spread on the surface so as to form no water drops, or which allows the condensed water on a surface thereof to penetrate into the surface layer. However, it has been believed that a water-impermeable sheet material must be provided with at least one hydrophobic and, sometimes, water-repellent surface thereof. This is because it has been believed that only the hydrophobic surface of the sheet material can cause the sheet material to be water-impermeable. Therefore, nobody has attempted to provide a water-impermeable sheet material having a non-hydrophobic surface thereof.

Also, it is known that the hydrophobic surface of the conventional water-impermeable sheet material is lipophilic and tends to be easily soiled with oily substances. The oily substances tend to not only adhere to the hydrophobic surface of the sheet material but also, to diffuse into the surface layer of the sheet material. The oily substances are highly hydrophobic and insoluble in water. Therefore, it is very difficult to remove or wash away the oily substances from the hydrophobic surface of the sheet material by utilizing water or rain.

Accordingly, it is desirable to provide a water-impermeable sheet material having a water-impermeable surface which exhibits no affinity with the oily substances and, therefore, highly resistive to being soiled with oily substances.

If the water-impermeable surface of the sheet material is hydrophilic, the hydrophilic surface will be readily received thereon hydrophilic substances and, therefore, will be easily soiled with the hydrophilic substances. However, the hydrophilic substances usually exhibit a high affinity with water. Therefore, it is easy to wash away the hydrophilic substances from the hydrophilic surface of the sheet material with water or rain.

SUMMARY OF THE INVENTION

An object of the present invention is to provide a water-impermeable sheet material having at least one hydrophilic surface effective for preventing undesirable formation of water drops thereon.

Another object of the present invention is to provide a water-impermeable sheet material having at least one hydrophilic surface which is highly resistive to being soiled with oily substances.

The above-mentioned objects can be attained by the water-impermeable sheet material of the present invention, which has one or two substantially water-impermeable surface layers, at least one of which surface layers holds thereon a water drop-preventing agent consisting of at least one hydrophilic but water-insoluble substance, at least a portion of said water drop-preventing agent being exposed to the ambient atmosphere.

DETAILED DESCRIPTION OF THE INVENTION

Figure 1:
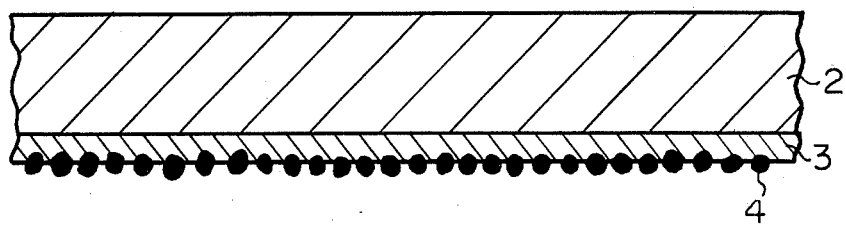
FIGS. 1, 2, 3 and 4 are explanatory graphic views of cross-sectional profiles of different embodiments of the water-impermeable sheet material of the present invention.

In the water-impermeable sheet material of the present invention, it is essential that at least one water-impermeable layer of the sheet material holds, on the surface thereof, a water drop-preventing agent consisting of one or more hydrophilic but water-insoluble substances and at least a portion of the water drop-preventing agent is exposed to the ambient atmosphere.

The sheet material may be composed of a single water-impermeable film or sheet alone comprising, as a principal component, a hydrophobic polymeric material. Otherwise, the sheet material may be composed of a fiber sheet substrate and at least one water-impermeable layer which has been formed on a surface of the fiber sheet substrate. The non-water-permeable layer comprises, as a principal component, a hydrophobic polymeric material. This type of composite water-impermeable sheet material is so-called "tarpaulin" or "rubber- or resin-coated water-proof canvas".

The hydrophobic polymer material can be selected from the group consisting of natural rubber, synthetic rubbers and hydrophobic synthetic polymers.

The synthetic rubber may be selected from the group consisting of chlorosulfonated polyethylene, silicone rubbers, polybutadiene, butadiene-styrene rubbers, acrylonitrile-butadiene-styrene rubbers, polychloroprene, polyisoprene and acrylic rubbers.

Also, the hydrophobic synthetic polymer may be selected from the group consisting of polyvinyl chloride, ethylenevinyl acetate copolymers, polyurethanes, acrylic ester polymers, polyamides, polyesters, petroleum rasins, alkyd resins, polyolefins and melamine resins.

The fiber sheet substrate may be in the form of a woven fabric, a knitted fabric, a non-woven fabric or a composite fabric composed of two or more of the above-mentioned fabrics. Also, the fiber sheet substrate may be composed of at least one member selected from the group consisting of natural fibers and artificial fibers. Usually, the natural fiber usable for the fiber sheet substrate is selected from the group consisting of cotton, linen, jute, ramie and asbestos. Also, the artificial fiber useful for the fiber sheet substrate may be selected from the group consisting of polyester fibers, for example, polyethylene terephthalate fibers; polyamide fibers, for example, nylon 6, nylon 66 and aramide fibers; water-insolubilized polyvinyl alcohol fibers, polyacryl fibers, and; glass fibers. It is more preferable that the fiber sheet substrate be a woven fabric made from water-insolubilized polyvinyl alcohol fibers. The above-mentioned fibers may be in any form of continuous multifilaments, continuous monofilament, staple fibers, split yarn and tape yarn.

The fiber sheet substrate may be impregnated with a water-proof agent, for example, paraffin; wax; metallic salt such as aluminium acetate; metalic soap, for example, aluminium soap; rosin soap; zirconium compounds, for example, zirconium salts of fatty acids; silicone compounds, for example, inethylhydrogen polysiloxane; chromium complexes, for example, steary chromic chloride; octadecyloxymethylpyridinium chloride; stearamidemethylpyridinium chloride; octadecylethylene urea; alkylketene dimers; methylol stearamide; and perfluorocarbon compounds.

It is preferable that the fiber sheet substrate has a tensile strength of 10 kg/3 cm or more, more preferably, 30 kg/3 cm or more, and an ultimate elongation of 80% or less, more preferably, 50% or less.

The water-impermeable layer can be formed on a surface of the fiber sheet substrate by applying the hydrophobic polymeric material thereto. The application can be effected by any conventional methods. For example, a film of the hydrophobic polymeric material is fuse-bonded to the surface of the fiber sheet substrate by using a heat-calender or a laminating machine. Otherwise, a liquid (solution, paste, or latex) containing the hydrophobic polymeric material is coated on or impregnated into the fiber sheet substrate by using a coating machine, topping machine or dipping machine. The liquid is solidified and cured so as to form an air and water-impermeable polymeric layer. The water-impermeable layer may contain any conventional additive, for example, pigment, anti-oxident, stabilizer, plasticizer, and anti-static agent.

In the water-impermeable sheet material of the present invention, the water drop-preventing agent is in the form of fine solid particles, which are hydrophilic and water-insoluble. The particles of the water drop-preventing agent may comprise at least one member selected from the group consisting of water-insoluble cellulosic substances; intra- or inter-molecularly cross-linked starch, polyacrylic acid and its alkali metal salts (Japanese Patent Application Laying-open (Kokai) No. 53-46389(1978)), polyacrylonitrile, polyethylene oxide, polyvinyl pyrrolidone, and sulfonated polyetyrene; saponified copolymers of a vinyl ester with an ethylenically unsaturated carboxylic acid or its salts or esters (Japanese Patent Application Laying-open (Kokai) No. 53-50290)); vinyl alcohol-acrylic acid salt copolymers; cellulosic substance graft-copolymerized with acrylonitrile; starch graft-copolymerized with acrylonitrile; water-insoluble salts of ethylenically unsaturated carboxylic acid polymers with alkali metals and polyvalent metals, and; methalchelated polymers each consisting of a water-soluble backbone chain moiety and at least one side chain moiety which is chelated with a metal atom to cause the polymer molecule, as a whole, to become water-insoluble (Japanese Patent Application Laying-open (Kokai) No. 48-46389). The water-insoluble cellulosic substances include linters of cotton, rayon, cupra and pulp. The starch, polyacrylic acid and its alkali metal salts, polyacrylonitrile, polyethylene oxide, polyvinyl pyrrolidone, sulfonated polystyrene can be intra- or inter-molecularly cross-linked with a conventional cross-linking agent. The saponified copolymers of a vinyl ester with an ethylenically unsaturated carbonylic acid may include completely or partially saponified copolymers of vinyl ester with acrylic acid or its salts or esters or methacrylic acid or its salts or esters.

More preferably, the hydrophilic and water-insoluble substances for the particles of the water drop-preventing agent are the cross-linked acrylic alkali metal salt polymers, the saponified copolymers of vinyl ester and ethylenically unsaturated carbonylic acid, its salts and esters, the metal chelated polymers and the copolymers of vinyl alcohol with acrylic acid salts. Also, polyacrylonitril fibers or powder intra-molecularly cross-linked with formaldehyde in the presence of hydroxylamine, hydrazine or a basic catalyst can be utilized as the water drop-preventing agent.

It is preferable that the particles of the water drop-preventing agent have an average size of 500 mesh size or less, preferably, from 30 to 500 mesh size. Also, it is preferable that the particles of the water drop-preventing agent are capable of absorbing therein water in an amount of at least 10 times, more preferably, at least 100 times, the weight of the particles. The amount of water absorbed by the particles of the water drop-preventing agent can be determined by the following method.

A predetermined dry weight (A) of the water drop-preventing agent particles is immersed in a deionized water for 30 minutes at a room temperature while slowly stirring the mixture. The water-absorbed particles are removed from the water and then centrifugalized. The weight (B) of the centrifugalized particles is determined. The amount of water absorbed by the particles of the water drop-preventing agent corresponds to the difference (B)−(A).

The particles of the water drop-preventing agent may be bonded onto the surface of the water-impermeable layer with or without an adhesive, so that at least a portion of each particle is exposed to the ambient atmosphere.

Figure 2:
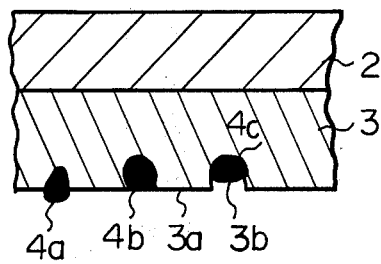

Referring to FIG. 1, a water-impermeable sheet 1 comprises a fiber sheet substrate 2 and a water-impermeable layer 3 formed on a surface of the fiber sheet substrate 2. Numerous solid particles 4 of a water drop-preventing agent are held on the lower surface of the water-impermeable layer 3 in such a manner that a portion of each particle 4 is in embedded in the air and water-impermeable layer 3 and the other portion of each particle 4 is exposed to the ambient atmosphere. The particles can be exposed to the ambient atmosphere in any manner. For example, referring to FIG. 2, a particle 4a has a lower portion thereof projected from the lower surface 3a of the water-impermeable layer 3. Also, another particle 4b is embedded in the water-impermeable layer 3 and has a lower surface thereof located at about the same level as that of the lower surface 3a. Furthermore, still another particle 4c is located in a concave portion 3b formed in the water-impermeable layer 3, and has a lower portion thereof exposed to the ambient atmosphere through the concave portion 3b.

The type of water-impermeable sheet material illustrated in FIG. 1 can be produced by the following methods.

In one method, an adhesive is applied to a surface of the water-impermeable layer, particles of the water drop-preventing agent are sprinkled on the layer of the adhesive, and, finally, the adhesive layer is cured.

In another method, before the water-impermeable layer is dried or cured, particles of the water drop-preventing agent are sprinkled on the surface of the water-impermeable layer and, finally, the water-impermeable layer is dried or cured. In still another method, the surface of the water-impermeable layer is heated so as to soften the surface, the particles of the water drop-preventing agent are sprinkled on the softened surface, and, finally, the softened surface is pressed with calender rollers while cooling.

In the water-impermeable sheet material as illustrated in FIG. 1, it is preferable that the particles of the water drop-preventing agent are in an amount of from 0.005 to 5.0 g per m$^2$ of the surface area of the water-impermeable layer.

The particles of the water drop-preventing agent may be dispersed in the water-impermeable layer in such a manner that at least a portion of the particles is exposed to the ambient atmosphere.

Figure 3:
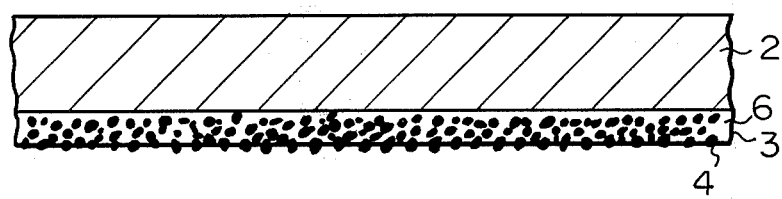

Referring to FIG. 3, a water-impermeable sheet 11 comprises a fiber sheet substrate 2 and a water-impermeable layer 3 in which numerous particles 4 of the water drop-preventing agent are dispersed in a matrix 6 of a hydrophobic polymeric material, and a portion of the particles is exposed to the ambient atmosphere.

In the type of water-impermeable sheet material illustrated in FIG. 3, a portion of the particles of the water drop-preventing agent located in the inside of the water-impermeable layer is effective for preventing water-permeation through cracks formed in the water-impermeable layer. This is because when water comes into contact with the particles of the water drop-preventing agent, the particles swell with the water so as to cause the cracks to be filled with the swollen particles. Therefore, the water is not allowed to permeate into the inside of the sheet material through the cracks.

In the above-described type of non-water-permeable sheet material, it is preferable that the particles of the water drop-preventing agent are in an amount of from 0.05 to 50 g per kg of the hydrophobic polymeric material matrix.

The non-water-permeable layer may contain therein numerous pores connected to the ambient atmosphere. In this case, a portion of the particles of the water drop-preventing agent are exposed to the pores. Therefore, when water penetrates into the pores, the particles exposed to the pores absorb the water and swell so as to fill the pores with the swollen particles. Therefore, the water-swollen particles can prevent water from passing through the sheet material. However, when the particles are dry, the water-impermeable layer becomes air-permeable through the pores.

The particles of the water drop-preventing agent may be contained in an additional surface layer which is formed on the surface of the water-impermeable layer in such a manner that at least a portion of the water drop-preventing agent particles is exposed to the ambient atmosphere. In this case, usually, the water drop-preventing agent particles are dispersed in a matrix comprising, as a principal component, a hydrophobic polymeric material selected from the group consisting of natural rubber, synthetic rubbers and hydrophobic synthetic polymers which are the same as those as used for the water-impermeable layer.

Figure 4:
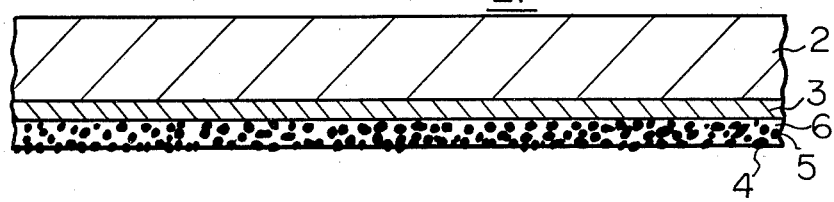

Referring to FIG. 4, a water-impermeable sheet 21 comprises a fiber sheet substrate 2, a water-impermeable layer 3 and an additional surface layer 5 in which numerous particles 4 of the water drop-preventing agent are dispersed in a matrix 6 consisting of a hydrophobic polymeric material, and a portion of the particles is exposed to the ambient atmosphere. The additional surface layer 5 may contain a number of pores connected to the ambient atmosphere, and a portion of particles of the water drop-preventing agent may be exposed to the pores.

In the additional surface layer, it is preferable that the particles of the water drop-preventing agent are in an amount of from 0.05 to 50 g per kg of the hydrophobic polymeric material matrix.

The additional surface layer can be prepared by any conventional method. That is, a liquid containing a mixture of the particles of the water drop-preventing agent with the hydrophobic polymeric material is coated on or impregnated in the water-impermeable layer.

The pores in the water-impermeable layer or the additional surface layer can be formed by any conventional pore-forming method. That is, the pores may be formed by using a foaming agent, by dissolving or decomposing a component in the layer, by a stretch void-forming operation or by an electrical discharge pore-forming operation.

The porous water-impermeable layer or the porous additional surface layer is effective for decreasing the heat conductivity of the sheet material. This feature is also effective for preventing the condensation of moisture in the space surrounded by the sheet material.

In the water-impermeable sheet material of the present invention, the surface property of the water-impermeable layer may be modified by applying thereonto the water drop-preventing agent per se or a liquid containing the water drop-preventing agent and by drying and, if necessary, curing it. The water drop-preventing agent may comprise at least one member selected from the group consisting of esters of higher fatty acids with polyol compounds, polyoxyalkylene alkylethers, polyoxyalkylene alkylphenols, polyoxyalkylene alkylamines, polyoxyalkylene alkylamides, polyoxyalkylene fatty acid esters, alkyl-polyalkyleneimines, alkylphosphorate esters and their salts, polyoxyalkylenealkylphosphate esters and their salts, polyoxyalkylenealkylsulfate esters and their salts, alkylamine salts, alkylguartanary ammonium salts, alkylimdazoline and its hydrophilic derivatives, alkylbetain and its hydrophilic derivatives, N-alkyl-β-alanine, aromatic phosphoric acid, its esters and salts and their hydrates, and aromatic sulfonic acid, its esters and salts and their bydrates.

The higher fatty acid-polyol esters include, for example, esters of higher fatty acids such as lauric acid, myristic acid, parmitic acid, stearic acid, montanic acid, oleic acid, linoleic acid and behenic acid, with sorbitan, glycerol, ethylene glycol, polyethylene glycol, polyoxyethylene glycerol, and pentaerythritol.

The alkyl phosphates include tributyl phosphate and triisooctylphosphate. The aromatic phosphates include tribenzylphosphate, triphenyl phosphate, phenyldecyl phosphate and diphenylisodencyl phosphate, the aromatic sulfonic acids include benzene sulfonic acid and p-toluene sulfonic acid.

The above-mentioned water drop-preventing agent per se or a liquid containing the water drop-preventing agent is applied onto a surface of the water-impermeable layer so as to form an additional hydrophilic layer on which water exhibits a contact angle of less than 90 degrees, preferably, 45 degrees or less, to the additional hydrophilic layer. It is preferable that the contact angle of water to the additional hydrophilic layer is close to zero degrees.

The liquid containing the water drop-preventing agent may be in the form of a solution or an emulsion. The liquid may contain, in addition to the water drop-preventing agent, a hydrophobic polymeric material selected from the group consisting of natural rubber, synthetic rubbers and hydrophobic synthetic polymers which are the same as those as used for the water-impermeable layer.

The present invention will be further illustrated by the following examples, which are provided for the purpose of illustration and should not be interpreted as in any way limiting the scope of the present invention.

EXAMPLE 1 AND COMPARATIVE EXAMPLE 1

In Example 1, a fiber sheet substrate consisting of a woven fabric of water-insolubilized polyvinyl alcohol staple fibers and having a structure of $$(20^S/3 \times 20^S/4)/(45 \times 38)$$

and a weight of 360 g/m², was washed with hot water and, then, dried.

The dried fiber sheet substrate was immersed in a coating liquid having the following composition.

| | | |
|---|---|---|
| Polyvinyl chloride | 80 | parts by weight |
| Butylbenzyl phthalate | 68 | " |
| Epoxidized soybean oil | 7 | " |
| Calcium carbonate | 20 | " |
| Cadmium-barium type stabilizer | 3 | " |
| Pigment (Cyanine Green) | 8 | " |
| Toluene | 130 | " |

The immersed substrate was removed from the coating liquid and squeezed by using a pair of squeezing rollers to such an extent that the amount of the coating liquid retained in the substrate corresponded to 120% of the weight of the substrate; the squeezed substrate was dried at a temperature of 90° C. for one minute and, then, the dried substrate was heat-treated at a temperature of 160° C. for one minute. The same operations as those described above were applied again to the resultant water-impermeable sheet. Just after the last heat-treating operation, particles of Sunwet IM-300, which is a trademark of starch graft-copolymerized with acrylonthile made by Sanyo Kasei Kogyo Co., Japan, were evenly sprinkled on a surface of the sheet on which the heat-treated coating layer was still in the state of a gel, and the surface was pressed with a pair of calender rolls while the surface was cooled. The particles of Sunwet IM-300 which had an average size of 100 mesh size were firmly bounded in an amount of 0.2 g/m² on the surface of the water-impermeable sheet.

The resultant water-impermeable sheet was subjected to a hydrostatic pressure test in accordance with ASTM D583-63, Method I. The results of the test revealed that the resistivity of the sheet to the penetration of water was 1500 mm or more in terms of hydrostatic head.

In comparative Example 1, the same procedures as those described in Example 1 were carried out except that the particles of Sunwet IM-300 were not applied to the cured non-water-permeable sheet surface. The resultant comparative sheet exhibited the same resistivity to water penetration as that of Example 1.

A tent having dimensions of 2 m×2 m×2 m was prepared from the sheet of Example 1. Also, a comparative tent having the dimensions of 2m×2 m×2 m was prepared from the comparative sheet of Comparative Example 1. In the tent of Example 1, the surface on which the particles of Sunwet IM-300 were held, faced the inside of the tent. In each tent, the inside space was conditioned to have a temperature of 40° C. and a relative humidity of 80%. Both tents were left standing overnight at a lowest atmospheric temperature of 5° C. It was observed that in the tent of Example 1, no water drops formed on the inside surface of the tent. However, in the comparative tent, it was found that a number of water drops formed on the inside surface of the comparative tent and fell to the floor of the comparative tent.

EXAMPLE 2 AND COMPARATIVE EXAMPLE 2

In Example 2, the same fiber sheet substrate as that described in Example 1, was immersed in a coating liquid of the following composition.

| | | |
|---|---|---|
| Hyparon 20 (Trademark of a chlorosulfonated polyethylene made by DuPont.) | 100 | parts by weight |
| Tribasic lead maleate | 40 | " |
| Dipentamethyleneturamtetrasulfide | 1 | " |
| Wood resin | 3 | " |
| Clay | 20 | " |
| Pigment (Cyanine Green) | 18 | " |
| Toluene | 500 | " |

The coating liquid exhibited a viscosity of 40 centipoise. The immersed substrate was squeezed with a pair of squeezing rollers to such an extent that the amount of the coating liquid retained in the substrate corresponded to 100% of the weight of the substrate, and then it was dried at a temperature of 140° C. for 2 minutes. The resultant sheet was subjected to the same operations as those mentioned above, except that 3 parts by weight of the particles of Hydrogel-S which is a trademark of a water-absorbing agent comprising, as a principal component, a copolymer consiting of vinyl alcohol moiety and acrylic acid salt moiety, made by Sumitomo Kagaku, Japan, were uniformly mixed with the same coating liquid as that mentioned above, and the squeezed sheet was heat-treated at a temperature of 140° C. for 4 minutes. The particles of Hydrogel-S had an average size of 350 mesh size.

The resultant sheet exhibited a resistivity to water penetration of 2000 mm in terms of hydrostatic head.

In Comparative Example 2, the same procedures as those described in Example 2 were carried out, except that no Hudrogel-S was mixed to the coating liquid. The resultant comparative sheet exhibited the same resistivity to water penetration as that in Example 2.

A tent made of the sheet to Example 2 was subjected to the same test as that described in Example 1. The results of the test revealed that no water drops formed on the inside surface of the tent.

The same test as that mentioned above was applied to a comparative tent made from the comparative sheet of Comparative Example 2. As a result, it was found that a number of water drops formed on the inside surface of the comparative tent and fell to the floor thereof.

EXAMPLE 3

The same procedures as those described in Example 2 were carried out, except that 1 part by weight of a foaming agent (Azodicarbonamide) was mixed, together with Hydrogel-S, to the coating liquid. The resultant sheet had a porous additional surface layer containing the particles of Hydrogel-S, and exhibited a resistivity to water penetration of 1500 mm or more in terms of hydrostatic head.

A tent made of the resultant sheet was subjected to the same test as that described in Example 1. As a result, no water drops formed on the inside surface of the tent.

EXAMPLE 4 AND COMPARATIVE EXAMPLE 3

In Example 4, the same fiber sheet substrate as that described in Example 1 was immersed in a coating liquid having the following composition.

| Polyvinyl chloride | 80 parts by weight |
|---|---|
| Butylbenzyl phthalate | 68 " |
| Epoxidized soybean oil | 7 " |
| Calcium carbonate | 20 " |
| Cadimuim-barium type stabilizer | 3 " |
| Pigment (Cyanine Green) | 8 " |
| Toluene | 130 " |
| Sunwet IM-300 | 10 " |

The immersed substrate was withdrawn from the coating liquid and squeezed in the same manner as that described in Example 1, dried at a temperature of 90° C. for one minute and, then, heat-treated at a temperature of 160° C. for one minutes. The same oerations as those described above were applied to the heat-treated sheet.

In Comparative Example 3, the same procedures as those described in Example 4 were carried out except that no Sunwet 1M-300 was used. The sheet of Example 4 exhibited a resistivity to water penetration of 1500 mm or more in terms of hydrostatic head, which resistivity was similar to that of the comparative sheet of Comparative Example 3.

In each of the sheets of Example 4 and Comparative Example 3, a slit having a length of 5 cm and extending from a surface to the opposite surface of the sheet, was formed by using a sharp blade. A predetermined amount (100 ml) of water was placed on an area of a surface of the sheet including the slit, and left standing for 24 hours so as to allow the water to penetrate into the slit. As a result, it was found that in the case of the sheet of Example 4, a small amount of water penetrated into the slit. However, the water was absorbed by the particles of Sunwet 1M-300 and, therefore, could not pass through the sheet. In the case of the comparative sheet, all amount of the water could pass through the sheet by permeating the slit.

EXAMPLES 5 AND 6 AND COMPARATIVE EXAMPLE 4

In Example 5, the same fiber sheet substrate as that described in Example 1 was impregnated with a water-repellent agent consisting of zinc stearate in an amount of 15% based on the weight of the substrate, and dried at a temperature of 90° C. for one minute.

The substrate was immersed in a coating liquid which had been prepared by mixing a mixture having the composition:

| Polyvinyl chloride | 100 parts by weight |
|---|---|
| Dioctyl phthalate | 100 " |
| Epoxy resin | 3 " |
| Barium stearate | 1 " |
| Hydrogen-S | 10 " |
| Toluene | 50 " | with another mixture of the composition:

| Calcium carbonate | 20 parts by weight |
|---|---|
| Dinitrosopentamethylenetetramine | 0.3 " |
| Citric acid | 1 " |
| 25% methylalcohol aqueous solution | 10 " |

The immersed substrate was removed from the coating liquid and squeezed in the same manner as that described in Example 1, and, then, gradually heated from a temperature of 50° C. to 190° C. over 3 minutes, to foam and gelatinize the coating liquid in the substrate. Therefore, the resultant sheet was simultaneously pressed and rolled with a pair of calender rollers. The resultant sheet was air-permeable.

In Example 6, the same procedures as those described in Example 5 were carried out, except that no water-repellent agent was applied to the fiber sheet substrate.

Both sheets of Examples 5 and 6 were subjected to an impact water penetration test in accordance with ASTM D583-63. In each sheet, no water penetration was found.

In comparative Example 4, the same procedures as those described in Example 5 were carried out, except that no Hydrogel-S was used. As a result of the impact water penetration test, it was found that no water could pass through the comparative sheet.

EXAMPLE 7 AND COMPARATIVE EXAMPLE 5

In Example 7, the same fiber sheet substrate as that described in Example 1 was impregnated with a coating liquid of the following composition:

| Polyvinyl chloride | 80 parts by weight |
|---|---|
| Butylbenzyl phthalate | 68 " |
| Epoxidized soybean oil | 7 " |
| Calcium carbonate | 20 " |
| Cadmium-barium type stabilizer | 3 " |
| Pigment (Cyanine Green) | 8 " |
| Toluene | 130 " |

The impregnated substrate was squeezed in the same manner as that described in Example 1, dried at a temperature of 90° C. for one minute and, then, heat-treated at a temperature of 160° C. for one minute. Water-impermeable layers were formed on both surfaces of the substrate. The resultant sheet was coated with an additional coating liquid which had been prepared by mixing the same coating liquid as that mentioned above with 3 parts by weight of a water drop-preventing agent consisting of 30% by weight of sorbitan laurate, 50% by weight of sorbitan stearate and 20% by weight of an additional product of sorbitan stearate with polyethylene oxide. The coated sheet was squeezed in the same method as that described in Example 1, dried at a temperature of 90° C. for one minute and, then, heat-treated at a temperature of 160° C. for one hour. Additional hydrophilic layers were formed on the water-impermeable layer surfaces.

In Comparative Example 5, the same procedures as those described in Example 7 were carried out, except that no water drop-preventing agent was used.

The resultant sheets of Example 7 and Comparative Example 5 were subjected to a hydrostatic pressure test and a spray test both in accordance with ASTM D583-63 and a wettability test in accordance with JIS K6768-1977. The results are indicated below.

| Item | Example 7 | Comparative Example 5 |
|---|---|---|
| Hydrostatic pressure test, Hydrostatic head (mm) | >1,500 | >1,500 |
| Spray test, spray rating | 0 | 90 |
| Wettability test, wettability index | 30 | 48 |

Also, it was determined that the contact angle of water to the surface of the sheet of Example 7 was less than 20 degrees and the contact angle of water to the surface of the comparative sheet of Comparative Example 5 was 140 degrees.

Each of the sheets of Example 7 and Comparative Example 5 were used to prepare a similar tent as that described in Example 1, and each tent was subjected to the same test as that described in Example 1. The results of the test revealed that no water drops formed on the inside surface of the tent of Example 7, whereas a number of water drops formed on the inside surface of the tent of Comparative Example 5 and fell to the floor thereof.

Each of the tents mentioned above was left standing outdoors for one year. During the testing period, it was observed that the outside surface of the tent of Example 7 was uniformly wetted with rain and completely resistive to water penetration therethrough, and stains formed on the outside surface were completely removed by rain. Therefore, even after the above-mentioned one year test was completed, substantially no stain was found on the outside surface of the tent. Also, the additional hydrophilic layers containing the water drop-preventing agent were remained firmly bounded to the non-water-permeable layers throughout the testing period. Furthermore, no deterioration of the additional hydrophilic layers were observed. However, in the case of the tent of Comparative Example 5, the outside surface exhibited a high water repellency in the initial stage of the testing period. The outside surface was soiled with stains which could not be removed by rain. Therefore, in the final stage of the testing period, the outside surface became dirty and was unevenly wetted by rain.

We claim:

1. A water-impermeable sheet material having one or two water-impermeable layers, at least one of which layers holds, on the surface thereof, a water drop-preventing agent in the form of fine solid particles and consisting of at least one hydrophilic but water-insoluble substance, at least a portion of said water drop-preventing agent being exposed to the ambient atmosphere.

2. A water-impermeable sheet material as claimed in claim 1, wherein said water-impermeable surface layer comprises, as a principal component thereof, at least one hydrophobic polymeric material.

3. A water-impermeable sheet material as claimed in claim 2, wherein said hydrophobic polymeric material is selected from the group consisting of natural rubber, synthetic rubbers and hydrophobic synthetic polymers.

4. A water-impermeable sheet material as claimed in claim 3, wherein said synthetic rubber is selected from the group consisting of chlorosulfonated polyethylene, silicone rubbers, polybutadiene, butariene-styrene rubbers, acrylonitrile-butadiene-styrene rubbers, polychloroprene, polyisoprene and acrylic rubbers.

5. A water-impermeable sheet material as claimed in claim 3, wherein said hydrophobic synthetic polymer is selected from the group consisting of polyvinyl chloride, ethylene-vinyl acetate copolymers, polyurethanes, acrylic ester polymers, polyamides, polyesters, petroleum resins, alkyd resins, polyolefins and melamine resins.

6. A water-impermeable sheet material as claimed in claim 1, wherein said particles of said water drop-preventing agent comprise at least one member selected from the group consisting of water-insoluble cellulosic substances; intra- or inter-molecularly cross-linked starch, polyacrylic acid and its alkali metal salts, polyacrylonitrile, polyethylene oxide, polyvinyl pyrrolidone, and sulfonated polyetyrene; saponified copolymers of a vinyl ester with an ethylenically unsaturated carboxylic acid or its salt or esters; vinyl alcohol acrylic acid salt copolymers; cellulosic substance graft-copolymerized with acrylonitrile; starch graft-copolymerized with acrylonitrile; water-insoluble salts of ethylenically unsaturated carboxylic acid polymers with alkali metals and polyvalent metals, and; metal-chelated polymers, each consisting of a water-soluble backbone chain moiety and at least one side chain moiety which is chelated with a metal atom to cause the polymer molecule, as a whole, to become water-insoluble.

7. A water-impermeable sheet material as claimed in claim 1, wherein said particles of said water drop-preventing agent have an average size of from 30 to 500 mesh size.

8. A water-impermeable sheet material as claimed in claim 1, wherein said particles of said water drop-preventing agent are capable of absorbing therein water in an amount of at least 10 times the weight of said particles.

9. A water-impermeable sheet material as claimed in claim 8, wherein said particles of said water drop-preventing agent are capable of absorbing therein water in an amount of at least 100 times the weight of said particles.

10. A water-impermeable sheet material as claimed in claim 1, wherein said particles of said water drop-preventing agent are bonded to the surface of said water-impermeable layer in such a manner that a portion of each particle is exposed to the ambient atmosphere.

11. A water-impermeable sheet material as claimed in claim 10, wherein said particles of said water drop-preventing agent are in an amount of from 0.005 to 5 g per $m^2$ of the surface area of said water-impermeable layer.

12. A water-impermeable sheet material as claimed in claim 1, wherein said particles of said water drop-preventing agent are dispersed in the water-impermeable layer in such a manner that a portion of said particles is exposed to the ambient atmosphere.

13. A water-impermeable sheet material as claimed in claim 12, wherein said water-impermeable layer contains therein a number of pores connected to the ambient atmosphere and a portion of said particles of said water drop-preventing agent is exposed to said pores.

14. A water-impermeable sheet material as claimed in claim 1, where said particles of said water drop-preventing agent are contained in an additional surface layer formed on the water-impermeable layer, in such a manner that a portion of said particles is exposed to the ambient atmosphere.

15. A water-impermeable sheet material as claimed in claim 14, wherein said additional surface layer contains therein a number of pores connected to the ambient atmosphere and a portion of said particles of said water drop-preventing agent is exposed to said pores.

16. A water-impermeable sheet material as claimed in claim 14, wherein, in said additional surface layer, said particles of said water drop-preventing agent are dispersed in a matrix comprising, as a principal component, at least one hydrophobic polymeric material selected from the group consisting of natural rubber, synthetic rubbers and hydrophobic synthetic polymers.

17. A water-impermeable sheet material as claimed in claim 1, wherein said water-impermeable layer is formed on a fiber sheet substrate.

18. A water-impermeable sheet material as claimed in claim 17, wherein said fiber sheet substrate is composed of at least one member selected from the group consisting of natural fibers and artificial fibers.

19. A water-impermeable sheet material as claimed in claim 18, wherein said natural fiber is selected from the group consisting of cotton, linen, jute, ramie and asbestos.

20. A water-impermeable sheet material as claimed in claim 18, wherein said artificial fiber is selected from the group consisting of polyester fibers, polyamide fibers, polyacryl fibers, water-insolubilized polyvinyl alcohol fibers and glass fibers.

* * * * *